April 8, 1969 L. E. PACKARD 3,437,812
VIAL CONSTRUCTIONS FOR USE IN STANDARDIZATION PROCEDURES
INVOLVING LIQUID SCINTILLATION SPECTROMETRY EQUIPMENT
AND HAVING A SEPARATE COMPARTMENT FOR AN INTERNAL
STANDARD RADIATION SOURCE
Original Filed June 18, 1964 Sheet 2 of 4

INVENTOR.
LYLE E. PACKARD,
BY
ATTORNEYS.

April 8, 1969 L. E. PACKARD 3,437,812
VIAL CONSTRUCTIONS FOR USE IN STANDARDIZATION PROCEDURES
INVOLVING LIQUID SCINTILLATION SPECTROMETRY EQUIPMENT
AND HAVING A SEPARATE COMPARTMENT FOR AN INTERNAL
STANDARD RADIATION SOURCE
Original Filed June 18, 1964 Sheet 3 of 4
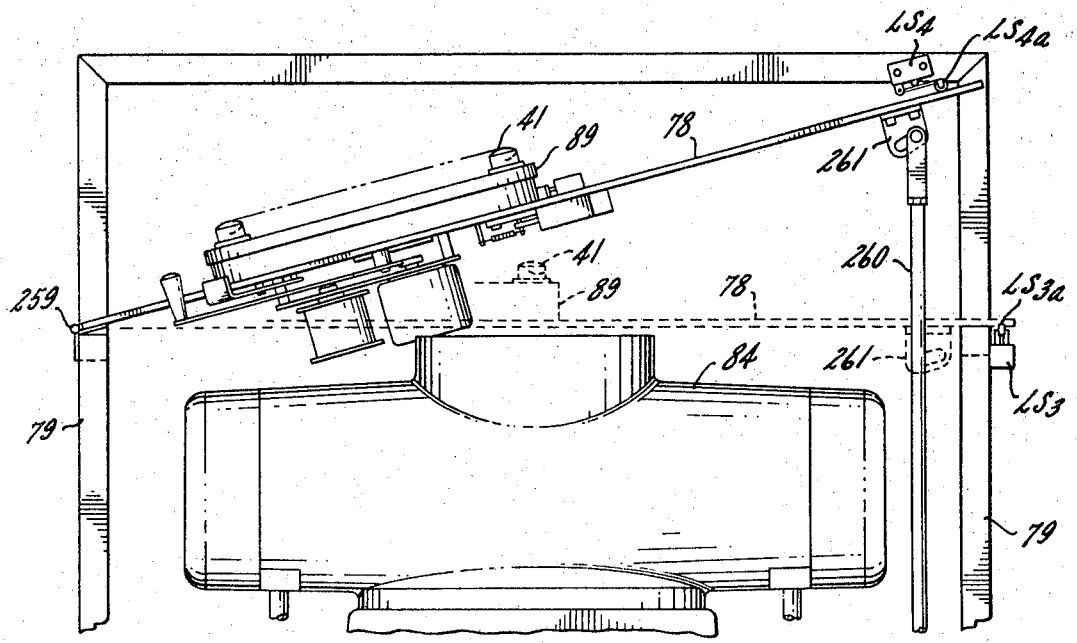
Fig. 5.
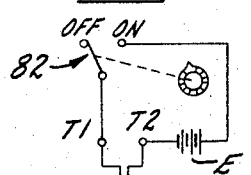
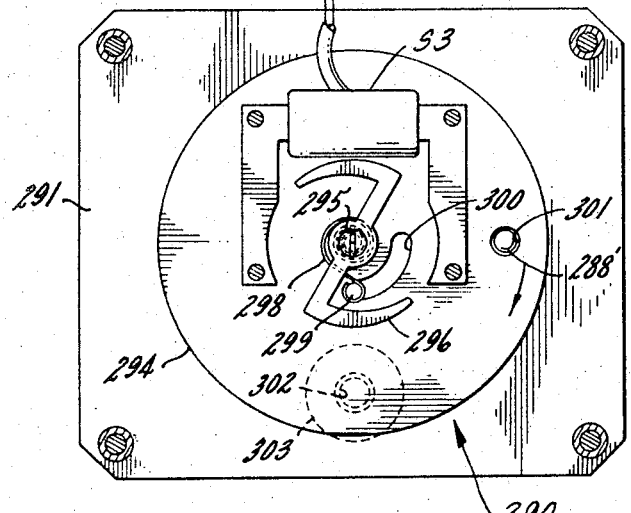
Fig. 7.
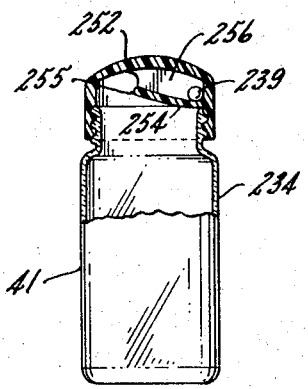
Fig. 4.
INVENTOR.
LYLE E. PACKARD,
BY
ATTORNEYS.

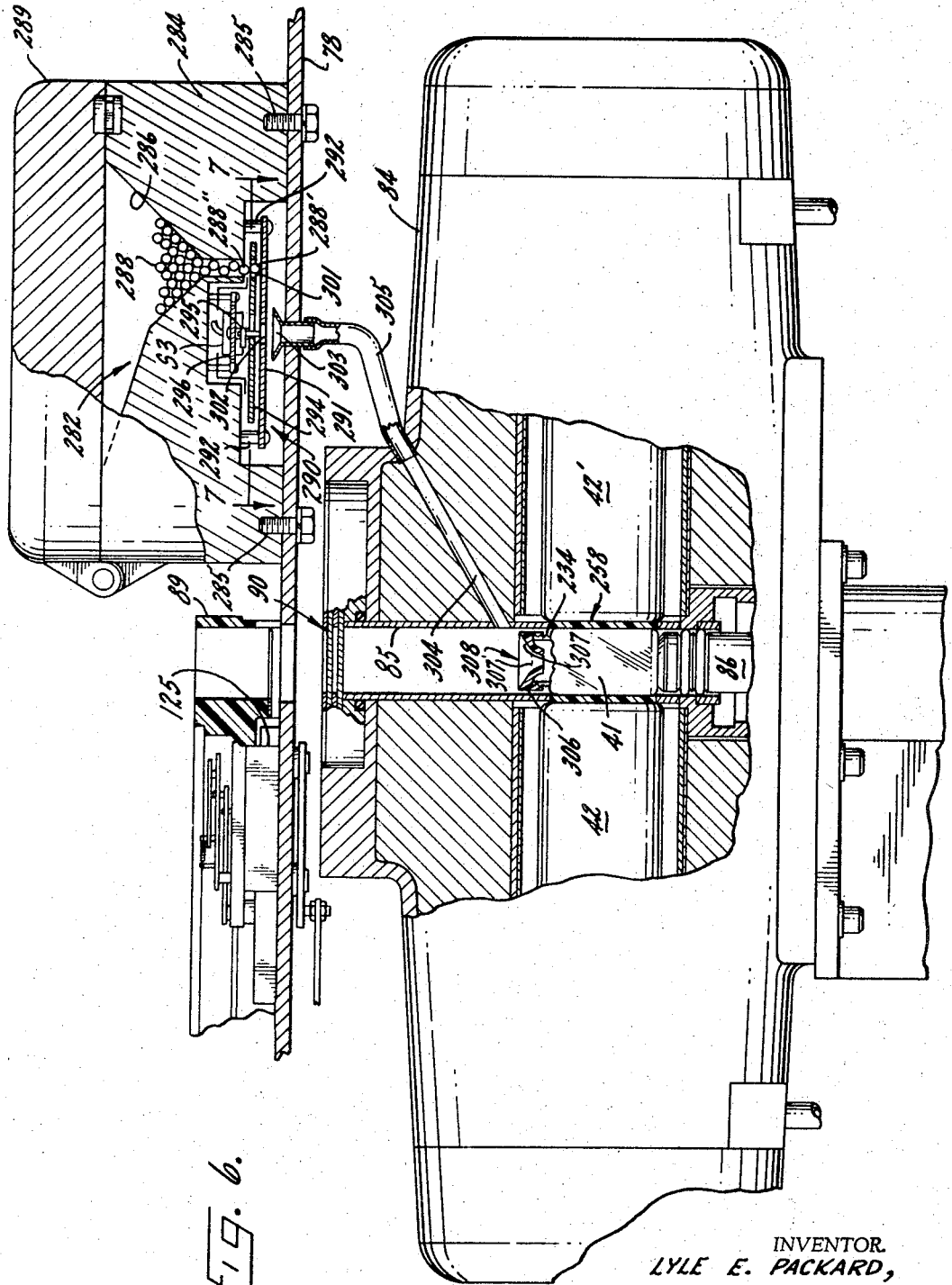
INVENTOR.
LYLE E. PACKARD,
BY
ATTORNEYS.

United States Patent Office 3,437,812
Patented Apr. 8, 1969

3,437,812
VIAL CONSTRUCTIONS FOR USE IN STANDARDIZATION PROCEDURES INVOLVING LIQUID SCINTILLATION SPECTROMETRY EQUIPMENT AND HAVING A SEPARATE COMPARTMENT FOR AN INTERNAL STANDARD RADIATION SOURCE
Lyle E. Packard, Hinsdale, Ill., assignor to Packard Instrument Company, Inc., Downers Grove, Ill., a corporation of Illinois
Original application June 18, 1964, Ser. No. 376,000, now Patent No. 3,188,468, dated June 8, 1965. Divided and this application Mar. 24, 1965, Ser. No. 442,241
Int. Cl. G21h 5/00; G01t 1/20
U.S. Cl. 250—106           5 Claims

ABSTRACT OF THE DISCLOSURE

An improved sample vial for use in transporting discrete test samples including a liquid scintillator and a radioactive isotope to and from a radiation detection station adapted to produce output signals in response to detection of light scintillations occurring in the liquid scintillator. The sample vial comprises a receptacle formed of light transmissive material for receiving and storing a quantity of the liquid scintillator and the radioactive isotope to be analyzed, and a removable closure for closing the receptacle. The vial also includes a compartment having its interior portions spaced away from any liquid scintillator contained within the receptacle so as to permit reception and normal maintenance of a solid standard radioactive source of radiation having relatively low penetrating power in spaced proximity to the liquid contained within the receptacle. Means are provided for permitting the standard radioactive source to be automatically discharged from the compartment into the liquid receptacle.

---

The present application is a divisional application based upon the copending application of Lyle E. Packard, Ser. No. 376,000, filed June 18, 1964, now Patent No. 3,188,468.

The present invention relates in general to liquid scintillation spectral analysis of test samples containing one or more radioactive isotopes disposed in a liquid scintillator and, more particularly, to improved sample vial constructions which are peculiarly suitable for use in conjunction with spectral analysis techniques and equipment that are either wholly automatic, semi-automatic, or manually operated, and that permit of corrective compensation for the effects of quenching and other phenomena such as instrument drift or line voltage drift, all of which tend to reduce counting efficiency. In its principal aspects, the invention is concerned with improved sample vials which, because of their construction, permit of reception and, in some instances, temporary storage of a standard radioactive source at a point in spaced relation to the contents of the sample vial while the latter is positioned in the detection chamber of radioactivity spectrometry equipment, yet wherein internal sources of relatively low penetrating power can be readily shifted from such point into the contents of the vial, internal sources of relative high or low penetrating power can be readily shifted from a remote position through such point into the contents of the vial, or external sources of relatively high penetrating power can be readily shifted from a remote position to such point.

It is a general aim of the present invention to provide improved sample vial constructions for use with radioactivity spectrometry equipment and methods and which permit of corrective compensation for the effect of quenching and similar phenomena that cause variation between the actual quantum of light photons emitted by any given scintillation and that detected, or variation in the total number of scintillations occurring in any given time period and the total number of scintillations detected in that period.

An ancillary object of the invention is to provide improved sample vial constructions which permit of transfer of a standard radiation source from a first position inoperatively associated with a radioactive test sample containing a liquid scintillator to a second position operatively associated with the test sample, thereby permitting the scintillations occurring in the liquid scintillator for each test sample to be counted at least twice—once when exposed to radiations emitted from the standard source and once when the standard source is disoperatively associated therewith.

Stated another way, an object of the invention is the provision of novel sample vial constructions which permit of positioning standard emitters, either internal or external emitters, in a selectable one, or alternately in both, of a first position disoperatively associated with the contents of the vial or a second positon operatively associated with the contents of the vial.

Another object of the invention is the provision of improved sample vial constructions which permit of automatic transfer of a standard source from a position disoperatively associated with the liquid scintillator in the vial to a position operatively associated therewith, yet which can be used with equal facility with automatic, semi-automatic, or manually operated spectrometry equipment.

Other objects and advantages of the invention will become apparent as the following description proceeds, taken in conjunction with the accompanying drawings, in which:

FIG. 4 is an enlarged elevational view, partly in section, of an exemplary sample vial suitable for use in positioning internal standards in accordance with another form of the invention;

FIG. 5 is a fragmentary elevational view similar to FIG. 1, but here illustrating an exemplary apparatus for simultaneously shifting internal standards located in a plurality of sample vials of the type shown in FIG. 4 from a position disoperatively associated with the vial contents to a position operatively associated therewith;

Figure 2:
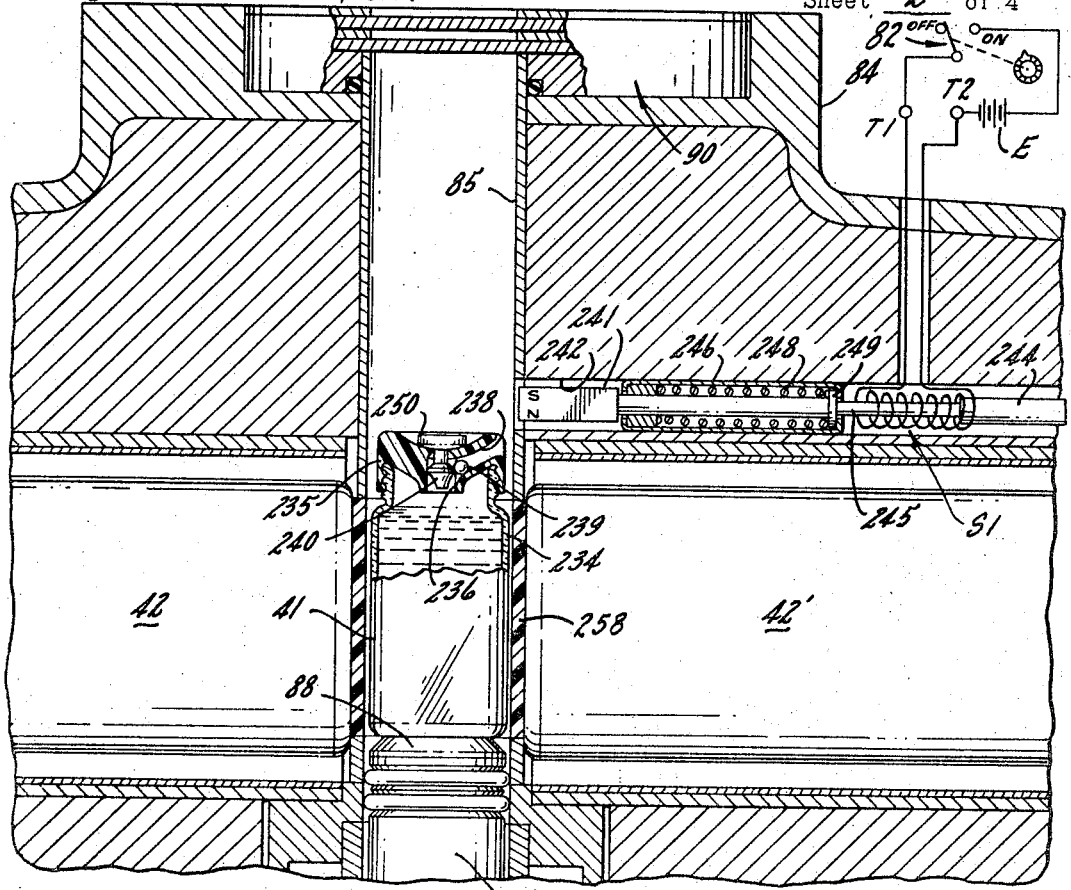
FIG. 2 is an enlarged, fragmentary vertical section of a portion of the apparatus shown in FIG. 1, here depicting one form of the invention for automatically introducing an internal standard source into a sample vial, the standard source here being shown in disoperative association with the vial contents.

FIG. 6 is a fragmentary, vertical sectional view similar to FIG. 2, but here depicting a sample vial in accordance with a modified form of the invention, together with apparatus for shifting standards of either penetrating or non-penetrating radiation from a point exterior of the detector housing to a point operatively associated with the sample vial, yet wherein the latter is retained in place in the detection chamber; and, FIG. 7 is a sectional view taken substantially along the line 7—7 of FIG. 6 and depicting an exemplary mechanism for transferring standard emitters one at a time from a supply hopper to a point operatively associated with the contents of the sample vial.

While the invention is susceptible of various modifications and alternative forms, specific embodiments thereof have been shown by way of example in the drawings and will herein be described in detail. It should be understood, however, that it is not intended to limit the invention to the particular forms disclosed, but, on the contrary, the intention is to cover all modifications, equivalents and alternatives falling within the spirit and scope of the invention as expressed in the appended claims.

Figure 1:
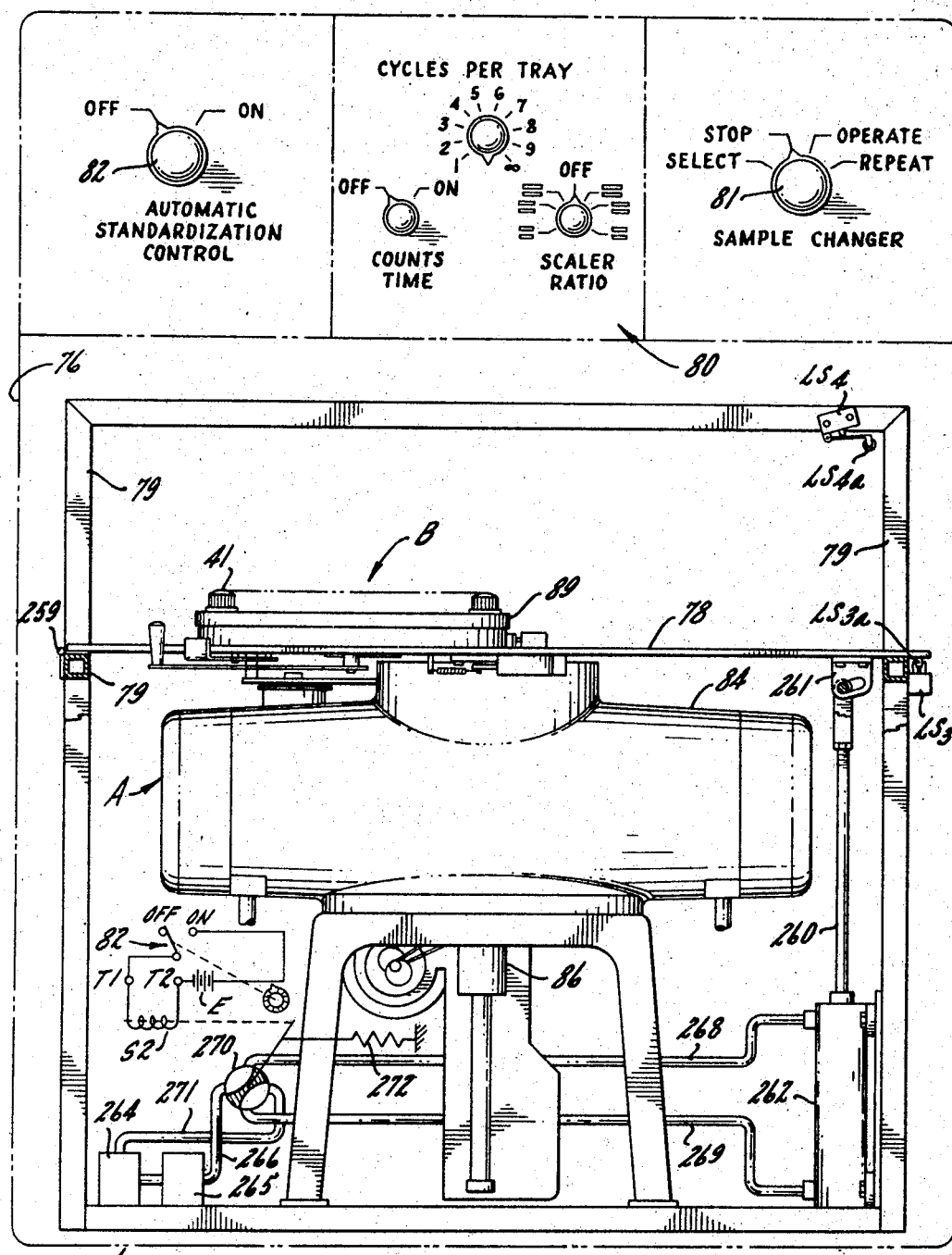
FIGURE 1 is a front elevational view of an exemplary automatic radioactive sample handling and measuring apparatus, here illustrating the component subassemblies of the apparatus housed in a suitable cabinet or console shown in phantom, such apparatus here being suitable for handling sample vials embodying the present invention.

Referring now to FIG. 1, there is illustrated an exemplary automatic sample processing apparatus, generally indicated at 75, which is intended to transfer a plurality of samples one at a time in seriatim order to and from a detection station. To this end, the exemplary apparatus 75 includes an elevator and detector mechanism, generally indicated at A, and a rotary tray alignment and indexing mechanism generally indicated at B.

As best illustrated in FIG. 1, the mechanisms A and B of the exemplary apparatus 75 are mounted in a console or cabinet 76 which is preferably refrigerated for the purpose of lowering the temperature to an equilibrium level so as to reduce thermal noise which otherwise tends to increase the level of spurious background signals. As here shown, the elevator and detector mechanism A is disposed in the lower end of the cabinet 76 with the rotary sample indexing mechanism B being physically mounted on a table 78 which overlies the upper end of the elevator and detector mechanism and is supported on the frame 79 of the apparatus 75. The cabinet or console 75 is dimensioned such that it defines a compartment 80 at its upper end which is suitable for receiving and mounting certain of the electrical components of the apparatus 75 such, for example, as printed circuit boards and the like (not shown). To provide for control of a sample changing and counting cycle, a plurality of manually operable switches are mounted on the front of the cabinet 76. For the moment it should suffice to note that one of the switches, here switch 81, is simply a Mode Selector Switch, while the switch depicted at 82 is an Automatic Standardization Control Switch. The function of this latter switch will be more fully described in conjunction with the ensuing description.

In the field of liquid scintillation spectrometry, the isotope containing substance to be analyzed is dissolved, suspended, or otherwise mixed in a liquid scintillation medium comprising a solvent and one or more of numerous commercially available scintillators or fluorescent materials, the scintillation medium being contained within a vial having light-transmissive walls. For ease in reference, the isotope containing substance, scintillating medium, and vial will hereinafter be referred to collectively as the "test sample," there being a plurality of such test samples shown at 41 in FIG. 1. Typical solvents commercially used in liquid scintillation work are benzene, toluene, xylene and ethers such, for example, as dioxane, anisole, and methyl Cellosolve; however, the foregoing does not represent an exhaustive list of such solvents. The solvent frequently includes as a minor constituent therein, alcohols such as methanol, ethanol or glycol. Sometimes water is also present in the solvent.

To facilitate an understanding of the present invention, the general organization and operation of the elevator and detector mechanism A will be briefly described hereinbelow. Those interested in a more complete operational and structural description of the mechanism A are referred to the aforesaid copending application of Lyle E. Packard, Ser. No. 376,000, filed June 18, 1964, now Patent No. 3,188,468 and assigned to the assignee of the present invention.

Referring to FIGS. 1 and 2 conjointly, it will be noted that the elevator and detector mechanism A includes a base assembly 84 which houses a pair of light transducers, for example, photomultipliers 42, 42' (FIG. 2) disposed on opposite sides of a vertical elevator shaft 85. Mounted within the elevator shaft 85 is an elevator 86 having a platform 88 at is upper end for reception of one of the radioactive test samples 41 from the rotary indexing mechanism B and transporting the sample downwardly into the elevator shaft where it is aligned between the photomultipliers 42 and 42'. Each sample 41 may, as heretofore indicated, simply comprise a vial or other suitable container within which is placed a liquid scintillator and the radioactive isotope or isotopes to be measured. Thus, as the isotope or isotopes undergo decay events, light scintillations are produced in the liquid scintillator, and such scintillations are then detected by the photomultipliers which produce electrical output signals in the form of voltage pulses corresponding to each light scintillation detected. At the completion of the counting cycle, the elevator 86 is returned upwardly to again position the sample 41 in the tray 89 from which it was removed. A shutter mechanism 90 is mounted on the upper end of the base assembly 84 for the purpose of preventing erroneous output signals from the photomultipliers 42, 42' resulting from environmental light. At the same time, the base assembly 84 is formed of suitable shielding material such, for example, as lead, which serves to minimize the amount of environmental ionizing radiation causing light flashes in either the scintillation medium or the photomultipliers.

Since the particular drive mechanism employed for indexing the tray 89 to bring successive samples 41 into alignment with the elevator 86, and the particular drive mechanism employed for raising and lowering the elevator 86 in timed relation to opening and closure of the shutter 90, are not critical to the present invention, they need not be further detailed here. Indeed, it will be recognized by those skilled in the art that the elevator 86 could be manually raised and lowered in a manner similar to that disclosed in one form of the invention disclosed and claimed in the copending application of Robert E. Olson, Ser. No. 273,110, filed Apr. 15, 1963, now Patent No. 3,198,948, and assigned to the assignee of the present invention. Similarly, the tray 89 could be indexed manually to bring successive samples 41 into alignment with the elevator 86. Alternatively, one or both of the elevator drive means and tray indexing means could be wholly automatic in operation. Those interested in the specific details of such automatic operation are referred to the aforesaid application of Lyle E. Packard, Ser. No. 376,000, now Patent No. 3,188,468.

Thus far, the environment of the invention has been carefully described in connection with the handling of a plurality of test samples and wherein (1), each sample 41 is delivered to a counting chamber, (2) the light scintillations occurring therein are counted and recorded, (3) the sample is then ejected and indexed, and (4) the next successive sample is delivered to the counting chamber. The present invention is concerned, however, with standardization of such samples, either by the use of internal or external standards, and wherein each sample is counted at least twice—once when exposed to radiations emanating from the standard source and once without being exposed to standard radiations.

In accordance with the present invention, provision is made for measuring the true activity levels of samples 41 by counting each of the samples at least twice—there being a first count representative of only decay events occurring in the isotopes present in each sample being analyzed, and a second count for each sample representative of a preselected band of scintillations of which at least a substantial number of the scintillations are created by radiations emanating from a standard source, which standard source can be an emitter of radiations having either a relatively high penetrating power or, alternatively, a relatively low penetrating power. In the latter instance, the standard source will take the form of an "internal standard" which can be either soluble or insoluble in the contents of the sample vial—that is, because the radiations emanating from the source have low penetrating power, the source must be in direct contact with, and preferably immersed in, the liquid scintillator before it is effective. On the other hand, when dealing with a source which emits radiations having relatively high penetrating power, the source will normally be maintained at a position remote from the test sample 41 and the detection chamber. In this case, when standardization is desired, the source is transferred from the remote position to a position which is either in the sample being analyzed (in this case the standard source is termed an "internal standard" and can be either soluble or insoluble) or, alternatively, adjacent to, but exterior of the test sample (here the source is termed an "external standard," it being understood that the radiations emitted will be capable of penetrating the vial and interacting with matter therein to produce a Compton interaction).

Figure 3:
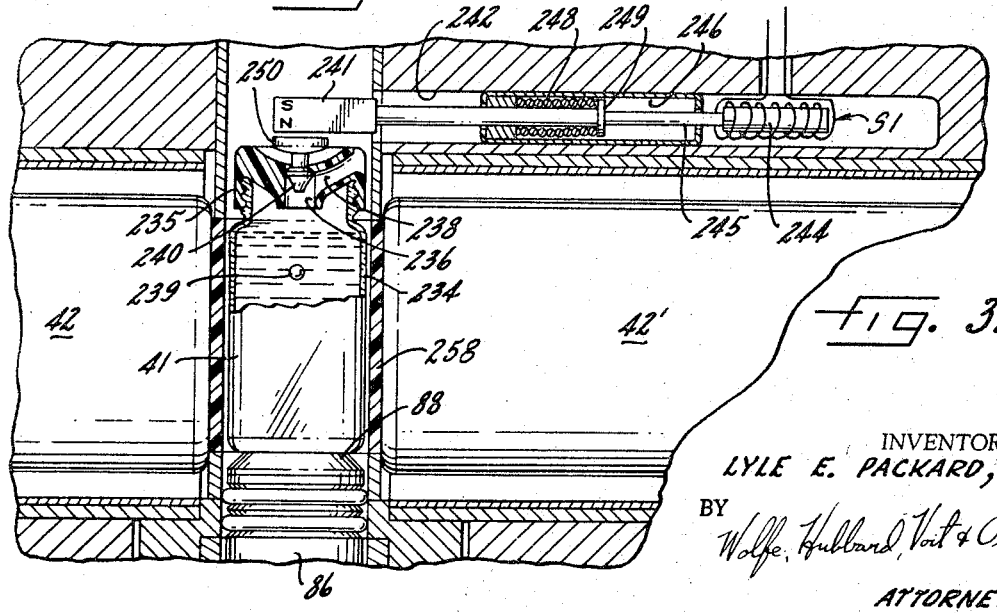
FIG. 3 is a view similar to FIG. 2, but here showing the internal standard source as the latter is shifted into operative association with the contents of the sample vial.

Turning now to FIGS. 2 and 3, there has been illustrated an examplary apparatus for automatically positioning internal standards which emit radiations having relatively low penetrating power, such apparatus here being shown in conjunction with a sample vial made in accordance with one form of the present invention. As here illustrated, the sample 41 includes a vial 234 made of light transmissive material and having a removable "screw-on" cap 235. In keeping with this form of the invention, the cap 235 is molded or otherwise formed with a laterally and downwardly extending passage 236 defining a compartment 238 in the cap adapted to receive a pellet 239 of a standard source having a known activity level. In order to maintain the pellet 239 in disoperative association with respect to the liquid scintillator contained in the vial 234, a vertically reciprocable plunger 240 is mounted in the cap, the plunger being positioned so that it normally impedes passage of the pellet into the vial 234.

Those skilled in the art will appreciated that the particular form of the standard 239 is not critical to the invention and it could have shapes other than the illustrative pellet form such, for example, as sheet, cube, strip or other forms. Moreover, the standard 239 can be made of material which is either soluble or insoluble in the solvent contained within the liquid scintillator. Finally, the standard 239 can be virtually any standard isotope of known energy level provided that it is an isotope which emits non-penetrating radiation. Preferably, however, the standard 239 will be the same isotope as that contained in the sample 41 or one having an energy spectrum similar thereto.

In carrying out this form of the invention, provision is made for releasing the standard 239 whenever it is desired to place the latter in operative association with the liquid scintillator. To accomplish this, a magnet 241 is mounted in a bore 242 formed in the housing 84 and positioned so that it can be selectively projected into the elevator shaft in close proximity to the cap 235. The exemplary magnet 241 is here connected to the armature 244 of a solenoid S1 having terminals T1, T2 by means of a connecting rod 245. The connecting rod 245 passes through a tubular spring housing 246 which is rigidly secured in the bore 242, the housing 246 here containing a compression spring 248 which acts against a collar 249 integral with the rod 245 to urge the magnet 241 into its retracted position.

The arrangement is such that when a voltage source is applied across the terminals T1, T2 of the solenoid S1, the latter is energized to urge the armature to the left (as viewed in FIGS. 2 and 3) against the biasing effect of the spring 248, thus projecting the magnet 241 outwardly to the position shown in FIG. 3. This serves to magnetically attract the plunger 240, the latter having a head 250 formed of magnetic material. As a consequence, the standard emitter 239 falls into the vial 234 as shown in FIG. 3, thus exposing the contents thereof to standardized radiation.

Referring now to FIG. 2, it will be observed that the voltage source for energizing the solenoid S1 has here been diagrammatically illustrated for purposes of simplicity as a battery E, the latter being arranged to be selectively coupled across the solenoid terminals T1, T2 by means of the Automatic Standardization Control switch 82 (FIGS. 1 and 2). Thus, it will be appreciated that when the technician desires to subject a test sample 41 to a counting cycle including standardization thereof, the sample is first prepared by placing the radioactive substance or specimen to be analyzed in the vial 234 containing a liquid scintillator. The internal standard 239 is then positioned in the compartment 238 where it is disoperatively associated with the contents of the vial 234. The sample 41 is then lowered into the detection chamber by the elevator 86 where the light scintillations produced are counted (for example, by well-known "preset count" or "preset time" counting procedures), it being understood that such scintillations are the result of radiations emanating only from the substance being analyzed. When the first count period is complete, the technician need only turn the Automatic Standardization Control switch 82 to the ON position, thus completing an energizing circuit for the solenoid S1 through the ON contacts of the switch 82. The magnet 241 is thus shifted to the position shown in FIG. 3, thereby retracting the plunger 240 and dropping the standard 239 from the compartment 238 into the contents of the vial 234. The sample 41 is then recounted during a second counting period and, during this second period, the count observed is representative of the composite effect of radiations emanating from both the standard 239 and the radioactive substance being analyzed.

Referring next to FIG. 4, there has been illustrated a slightly modified sample vial construction also embodying features of the present invention. As here illustrated, the test sample 41 includes a sample vial 234 which is identical with the vial shown in FIGS. 2 and 3. However, in this form of the invention, the sample vial 234 is closed by means of a screw-on cap 252 which is molded or otherwise formed with an interiorly disposed, integral shelf 254 positioned slightly above the threaded portion of the cap. Preferably the shelf 254 extends only partially across the cap 252, the shelf being provided with a raised lip portion 255 adjacent its free edge and sloping downwardly towards the junction of the shelf and the sidewall of the cap. The arrangement is such that the shelf 254 defines with the cap 252 a compartment 256 adapted to receive a standard emitter of non-penetrating radiation, here shown as a pellet 239 which can be either identical or similar to the pellet shown in FIGS. 2 and 3.

In order to position the standard emitter 239 in the test sample 41 while maintaining the emitter and liquid scintillator disoperatively associated with one another, the technician merely inserts the pellet 239 into the compartment 256 by removing the cap and slipping the pellet over the raised lip 255. This would, of course, be most conveniently done at the same time that the liquid scintillator and substance to be analyzed are inserted into the vial 234 and, thereafter, the lip 255 will tend to inhibit inadvertent displacement of the emitter from the compartment 256 into the liquid contents of the vial.

It will be appreciated upon inspection of FIG. 4 that when it is desired to expose the liquid scintillator to radiations emanating from the standard emitter 239, it is merely necessary to tilt the test sample 41 slightly (counterclockwise as viewed in FIG. 4) until the lip 255 constitutes the lowest portion of the shelf, at which time the pellet 239 will slip or roll off the shelf and into the interior portion of the vial 234 where it is operatively associated with the liquid scintillator. Such tilting movement of the vial could be achieved in various ways. For example, the test sample 41 could be removed from the mechanism A and then manually tilted. Alternatively, closure of the ON contacts of the switch 82 could serve to condition a solenoid, fluid system, or the like (not shown) to effect tilting movement of the entire elevator and detector mechanism A (FIG. 1).

Of course, the weight of the housing 84 and associated shielding would tend to make the foregoing semi-automatic system somewhat unwieldy. However, the same desired result could be achieved by tilting only a portion of the elevator and detector mechanism A. Thus referring to FIG. 2, it will be noted that when a test sample is positioned between the photomultipliers 42, 42', it is received within a "light pipe" 258 and while the "light pipe" in the exemplary apparatus is shown as a stationary element, it could, if desired, be pivotally mounted within the housing 84 and normally biased into a position aligned with the vertical bore defining the elevator shaft 85. In this event, closure of the ON contacts of the switch 82 might, for example, be effective to energize a solenoid for pivoting the "light pipe" 258 and thus tilting the sample.

Of course, either of the foregoing semi-automatic systems would require some means for properly orienting the cap 252 within the "light pipe" relative to the direction of pivotal movement so as to insure that the pellet 239 would fall off the shelf 254 when the latter is tilted. Such means, which might take the form of cooperable cam surfaces (not shown) on the cap and elevator shaft 85, are well known to those skilled in the art and need not be described in detail herein. Such systems and means have been only briefly described herein to show the adaptability of the sample vial construction shown in FIG. 4 for use with electrical control systems of the type disclosed in the aforesaid Packard application, Ser. No. 376,000, wherein each sample 41 is automatically counted twice while maintained within the detection chamber and, incident to completion of the first count, the standard emitter 239 is shifted into the vial 234 where it is exposed to the liquid scintillator during the second count.

In order to make clear one exemplary system for effecting pivotal or tilting movement of the sample vial shown in FIG. 4, reference is made to FIGS. 1 and 5 taken conjointly wherein there has been illustrated an exemplary sample handling system which is particularly suited for use with vials of the type illustrated in FIG. 4. As here shown, the table 78, which serves to support and physically locate the tray 89 of samples 41 relative to the elevator and detector mechanism A, is hinged to one side frame 79 of the apparatus by a hinge 259 or similar pivotal connection. The opposite side of the table 78 is dimensioned to rest on the right side frame 79 with freedom for vertical upward movement relative thereto. To effect such vertical movement, the right side of the table 78 is coupled through a connecting rod 260 and bracket 261 to a piston and cylinder assembly, generally indicated at 262. The latter is operatively connected to a fluid source 264 and a pump 265 by means of fluid conduits 266, 268, 269 and a control valve 270. A bleed line 271 is coupled directly between the valve 270 and the fluid source 264.

As here shown, the valve 270 is selectively actuated by a solenoid S2, and is normally biased by a spring 272 into a position wherein the upper end of the piston and cylinder assembly 262 is coupled to the discharge side of the high pressure pump through the conduits 266, 268. When the solenoid S2 is deenergized (as shown in FIG. 1), the lower end of the piston and cylinder assembly 262 is coupled to the fluid source through the conduit 269 and the bleed line 271. Under these conditions, the piston and cylinder assembly biases the connecting rod 260 and table 78 to a normal horizontal position as shown in FIG. 1. Conversely, when the solenoid S2 is energized, the valve 270 couples conduit 268 to the bleed line 271 and conduit 269 to the high pressure line 266, thus pressurizing the lower end of the assembly 262 and urging the right-hand side of the table 78 upwardly about the fixed hinged connection 259.

Referring to FIG. 5, it will be noted that when the table 78 is in its lower horizontal position (as depicted by the broken line position 78) the right edge of the table operatively engages and depresses the actuator LS3$_a$ of a limit switch LS3. When the table 78 is raised to its inclined solid line position, it engages and depresses the actuator LS4$_a$ of a limit switch LS4. The functions of these limit switches need not be fully described herein since they would normally be utilized in a wholly automatic sample processing system of the type disclosed and claimed in the aforesaid Packard application, Ser. No. 376,000. It should suffice here to say that depression of the actuator LS4$_a$ serves to complete an energizing circuit for an alignment motor (not shown) carried by the table and which serves to rapidly rotate the tray 89 while the table 78 is inclined. Similarly, depression of the actuator LS3$_a$ serves to complete an energizing circuit for a tray indexing motor M1 (FIG. 5) so as to return the tray 89 to its proper indexed position when the table 78 is returned to the horizontal position. Those interested in ascertaining specific details of the foregoing automatic tray rotating and tray indexing systems are referred to the aforesaid Packard application.

It will be appreciated from the foregoing description, that when the table 78 is raised to its inclined position as shown in FIG. 5, the tray 89 of samples 41 is also inclined, although the tray remains operatively engaged with a three-point centering system (fragmentarily shown at 125 in FIG. 6 and fully disclosed and described in the aforesaid Packard application). Consequently, it is merely necessary to rotate the tray 89 one or more times, during which period the standard emitters 239 will all drop out of their respective compartments 256 (FIG. 4). Such rotation of the tray 89 could be effected manually, but would preferably be done automatically in the manner hereinabove referred to and described in the aforesaid Packard application.

Thus, in this form of the invention, the samples 41 are all counted once without being exposed to standardized radiation. Upon completion of, and incident to recordation of, the count of observed scintillations for the last sample 41 in the tray, the technician need only turn the Automatic Standardization Control switch 82 (FIG. 1) on the ON position, thus completing an energizing circuit for the solenoid S2 through the battery E and ON contacts of the switch 82 (as best shown diagrammatically in the lower portion of FIG. 1). This serves to shift the valve 270, thus coupling conduit 268 to the bleed line 271 and conduit 269 to the high pressure line 266 so as to pressurize the lower end of the assembly 262 and pivot the table 78 upwardly about the hinged connection 259. After the tray of samples has been rotated while inclined so as to spill the standards 239 (FIG. 4) out of their compartments 256, the technician need only turn the switch 82 to the OFF position, thus deenergizing the solenoid S2, reversing the valve connections so as to pressurize the upper end of the assembly 262, and thereby returning the table 78 to a horizontal position. It will, of course, be appreciated that in a wholly manual system, the technician could achieve the desired results simply by manual removal of the tray 89 and hand rotation thereof while inclined.

Thus far, the invention has been described in conjunction with sample vials suitable for use in receiving and temporarily storing standard sources of non-penetrating radiation at a point disoperatively associated with the vial contents, and for subsequently permitting transfer of the standard source into the vial contents so as to enable standardization thereof. Sources of non-penetrating radiation are preferred in such exemplary constructions simply because the shielding requirements when using sources of penetrating radiation are such that it would be difficult to support the source in or on the sample vial while maintaining the source disoperatively associated with the contents of the vial. However, in its broader aspects, the invention is concerned with improved sample vial constructions which are particularly suited for exposing a test sample 41 to a source of standardized radiation irrespective of whether the radiation emitted is of the penetrating or non-penetrating variety.

In order to permit attainment of the broader objectives of the invention, provision is made for storing standard sources at a point remote from the sample 41 then in the detection chamber and for shifting the source into operative association with the test sample when standardization thereof is required, yet wherein the test sample is retained in place in the detection chamber. To this end, and with particular reference to FIG. 6, there is depicted an exemplary standardization system including a supply hopper 282 which is rigidly secured to the upper surface of the table 78 at a point laterally of the tray 89 and the vertically disposed elevator shaft 85. As here shown, the supply hopper includes a base portion 284 which is made of suitable shielding material such, for example, as lead, the base portion being rigidly secured to the table by bolts or the like 285. A generally funnel-shaped hopper 286 is formed in the base portion for the purpose of storing a plurality of standard sources 288, the latter being here depicted in pellet form. To minimize the danger to personnel resulting from escaping radiation, the supply hopper preferably includes a cover 289 made of suitable shield material and hinged to the base portion so as to permit replenishment of the supply of standard sources.

In carrying out this form of the invention, provision is made for transferring the standard sources 288 one at a time to respective successive ones of the test samples 41 after the latter have been counted once while isolated from the sources. To accomplished this, a rotary transfer mechanism 290 is mounted on the underside of the base portion 284, the transfer mechanism including a stationary plate 291 suspended from the base portion on brackets 292. A rotary transfer disc 294 is mounted above the plate for oscillatory movement on a shaft 295, the latter being journaled for rotation adjacent its lower end in the plate 291 and secured adjacent its upper end to the armature 296 of a rotary solenoid S3 (FIG. 7).

The arrangement is such that when the solenoid S3 is deenergized (as shown in FIG. 7), the disc 294 is biased in a counterclockwise direction by means of a spring 298 having one end secured to the shaft 295 and its opposite end secured to a post 299. The post 299 is rigidly secured to the plate 291 and passes upwardly through an arcuate slot 300 formed in the disc 294. In this condition, coaction of the slot 300 and post 299 serves to limit movement of the disc so as to align an aperture 301 formed therein with the lower discharge end of the funnel-shaped hopper 286, thus permitting the lowermost source 288' to drop into the aperture where it rests on the plate 291 (as best shown in FIG. 6).

However, when the solenoid S3 is energized, the armature 296 rotates (clockwise as viewed in FIG. 7) through an angle of approximately 90 degrees and, during such rotation, the source 288' confined in the aperture 301 is carried on the plate 291 through an arcuate path to an aperture 302 located in the plate at a point aligned with a funnel-shaped delivery chute 303 supported on the table 78. The lower end of the chute is coupled to a delivery passage 304 formed in the housing 84 by means of a conduit 305. As here shown, the passage 304 terminates at a point in the wall of the elevator shaft 85 located immediately above the upper surface of the test sample 41. In order to permit passage of the source into the sample vial 234, the latter is provided with a screw-on cap 306 embodying a modified form of the invention and having a funnel-shaped passage 308 formed centrally thereof defining a compartment 307 therein.

Thus, when the solenoid is energized and the armature 296 reaches its limit position, the source 288' is free to fall due to gravity through the chute 303, conduit 305, and passageway 304, from which it is discharged directly into the test sample 41 via the funnel-shaped passage 308 in the cap 306. Of course, during the period when the solenoid S3 is energized so as to transfer the source 288' laterally of the plate 291, the next source 288' is supported on the upper surface of the transfer disc 294 but is prevented from moving laterally since it is still partially confined within the discharge end of the hopper 286. Therefore, after the source 288' is delivered to the test sample 41 and the solenoid S3 is deenergized, the spring 298 will function to return the disc to its initial position where the next source 288" is free to drop into the aperture 301 formed therein in readiness for the standardization count for the next sample.

Referring now to FIG. 7, it will be noted that the energizing circuit for the solenoid S3 is substantially identical to those previously described in connection with FIGS. 1 and 2 for energizing the solenoids S1 and S2 respectively. Thus, the terminal T2 for the solenoid S3 is here coupled to one side of a battery E, while the opposite side of the battery is selectively coupled to, or uncoupled from, the terminal T1 by means of the ON-OFF contacts of the manually operated Automatic Standardization Control switch 82. Therefore, when the technician wishes to introduce a standard source 288 into the contents of the vial 234 shown in FIG. 6, it is necessary only to momentarily turn the switch 82 to the ON condition, thus energizing the solenoid S3 and transferring the source 288' shown in FIG. 6 to a position aligned with the chute 303. The source then drops through the chute 303 and conduits 304, 305 directly into the test sample 41 via the funnel-shaped passage 308 and compartment 307.

Of course, those skilled in the art will appreciate that the standard sources 288 shown in FIG. 16 could be sources of either penetrating or non-penetrating radiation. Moreover, the pellets 288 can be formed of soluble or insoluble material. However, it will be appreciated that in those instances where the standard sources 288 emit radiations of relatively low penetrating power, it is essential that the source pass into the liquid contents of the vial 234 before the radiations emanating therefrom will be effective in producing light scintillations. On the other hand, if the standard sources are of the type which emit radiations having relatively high penetrating power, it is not necessary that they drop into the interior of the vial but, rather, the sources need only be shifted to a predetermined point immediately adjacent the test sample 41. When so positioned, the highly penetrating radiations are capable of passing through the vial wall and interacting with matter within the vial so as to produce light scintillations therein as a result of Compton interactions, which light scintillations are indistinguishable from those produced by the radioactive substance being analyzed.

Keeping the foregoing in mind, it will be appreciated that in those instances where the technician wishes to employ external standards during a standardization count, it is merely necessary that the sources 288 shown in FIG. 6 by properly dimensioned relative to the funnel-shaped compartment 307 in the test sample 41 such that the source cannot pass into the vial but, rather, it seats in the compartment 307. This, of course, means that the external sources must be slightly larger than the throat of the funnel-shaped passage 308.

The improved vial construction shown by way of example in FIG. 6 possesses a number of distinct advantages. For example, since a standard source 288 somewhat larger than the throat of the funnel-shaped passage 308 will simply rest in the compartment 307, it greatly facilitates removal of the source from the test sample 41 following a standardization count. Moreover, this also enables repetitive standardization procedures for a plurality of samples while using only a single source. And, of course, each time that the standard source is introduced into the detection chamber, it occupies substantially the same position relative to the test sample 41 and the photomultipliers 42, 42'. Therefore, standardization counts for each sample are entirely significant with respect to corresponding counts for each other sample.

In keeping with this aspect of the invention, it will be appreciated that the compartment 307 defined in the cap 306 need not include a through passage communicating with the interior of the vial 234 if the technician is dealing only with external standard sources. Thus, the compartment 307 could simply take the form of a downwardly dished concavity as shown diagrammatically in FIG. 6 by the broken line 307' extending across the throat of the funnel-shaped passage 308. Such a construction would, of course, be suitable only for use with external standards.

Those skilled in the art will appreciate that a "standard radioactive source" will embrace any source of standardized radioactivity irrespective of whether such source comprises a single isotope suitable for use with "single-label" samples or a plurality of isotopes suitable for use with "multiple-label" samples (i.e., samples containing two or more isotopes), and it is in this context that such phrases have been used in the appended claims. It is only necessary that such sources of standardized radioactivity be capable of producing a "known energy spectrum"—that is, an energy spectrum having a known shape and quantitatively representative of a known activity strength or level, for example, in terms of decay events or counts per unit of time such as d.p.m. (decay events per minute) or c.p.m. (counts per minute).

I claim:

1. For use in transporting discrete test samples each including a liquid scintillator and a radioactive isotope therein to and from a radiation detection station adapted to produce output signals in response to detection of light scintillations occurring in the liquid scintillator, a sample vial comprising, in combination, a receptacle formed of light transmissive material for receiving and storing a quantity of the liquid scintillator and the radioactive isotope to be analyzed, a removable closure for closing said receptacle to maintain said liquid scintillator and radioactive isotope therein, means integral with said vial defining a compartment having its interior portion spaced from any liquid scintillator contained within the receptacle so as to permit reception and normal maintenance of a solid standard radioactive source of radiations having relatively low penetrating power in spaced inoperative proximity to the quantity of liquid contained within the receptacle, means forming an entranceway to said compartment, said entranceway being accessible from outside the vial, and movable gating means operatively associated with said compartment and spaced from any liquid scintillator contained within said receptacle, said gating means having a normally closed position for blocking the discharge of the contents of said compartment from said compartment into the liquid contents of said receptacle, and an open position for permitting unimpeded selective discharge of the contents of said compartment from said compartment and into the liquid contents of said receptacle, said gating means being spaced at least as far from any liquid scintillator contained within said receptacle, in said open position as in said closed position, said compartment being adapted to automatically discharge the contents thereof into said receptacle when said gating means is in said open position.

2. For use in transporting discrete test samples each including a liquid scintillator and a radioactive isotope disposed therein to and from a radiation detection station adapted to produce output signals in response to detection of light scintillations occurring in the liquid scintillator, a sample vial comprising, in combination, a receptacle formed of light transmissive material for receiving and storing a quantity of the liquid scintillator and the radioactive isotope to be analyzed, a removable closure for closing said receptacle to maintain said liquid scintillator and radioactive isotope therein, means associated with said vial defining a compartment having its interior portion spaced from any liquid scintillator contained within the receptacle so as to permit reception and normal maintenance of a standard radioactive source of radiations having relatively low penetrating power in spaced inoperative proximity to the quantity of liquid already contained within the receptacle, means forming an entranceway to said compartment, said entranceway being accessible from outside the vial, a discharge passage connecting said compartment with the interior of said receptacle, movable gating means operatively associated with said compartment and spaced from any liquid scintillator contained within said receptacle, said gating means having a normally closed position for blocking the discharge of the contents of said compartment from said compartment through said discharge passage into the liquid contents of said receptacle, and an open position for permitting discharge of the contents of said compartment through said discharge passage into the liquid contents of said receptacle, said gating means being spaced at least as far from any liquid scintillator contained within said receptacle in said open position as in said closed position, said compartment being adapted to automatically discharge the contents thereof into said receptacle when said gating means is in said open position.

3. A sample vial as defined in claim 1 wherein at least a portion of said gating means is magnetically permeable.

4. A sample vial as defined in claim 1 wherein said compartment, the entranceway to said compartment, and said gating means are all contained in said removable closure.

5. A sample vial as defined in claim 2 wherein said compartment, the entranceway to said compartment, said gating means, and said discharge passage are all contained in said removable closure.

References Cited

UNITED STATES PATENTS

| 2,285,440 | 6/1942 | Kaiser. | |
| 2,912,134 | 11/1959 | Kuhlman | 215—6 X |
| 3,060,942 | 10/1962 | Finlay | 215—6 X |
| 3,070,094 | 12/1962 | Sarnoff et al. | 215—6 X |
| 3,106,306 | 10/1963 | Ebner | 215—56 |

RALPH G. NILSON, *Primary Examiner.*

SAUL ELBAUM, *Assistant Examiner.*

U.S. Cl. X.R.

206—42; 215—6, 56; 250—71.5